United States Patent [19]
Winfrey et al.

[11] Patent Number: 5,167,343
[45] Date of Patent: * Dec. 1, 1992

[54] RECEPTACLE FOR FACILITATING RECYCLABLE TRASH SEPARATION

[76] Inventors: Betty J. Winfrey, 202 Vine; Donald D. Smith, 257 10th St., both of Burlington, Colo. 80807

[*] Notice: The portion of the term of this patent subsequent to Dec. 17, 2008 has been disclaimed.

[21] Appl. No.: 808,014

[22] Filed: Dec. 13, 1991

Related U.S. Application Data

[63] Continuation-in-part of Ser. No. 584,169, Sep. 18, 1990, Pat. No. 5,072,852.

[51] Int. Cl.$^5$ .............................................. B61D 25/16
[52] U.S. Cl. ................................... 220/404; 220/909; 220/529
[58] Field of Search ............... 220/909, 404, 403, 908, 220/529

[56] References Cited

U.S. PATENT DOCUMENTS

| | | | |
|---|---|---|---|
| 3,893,615 | 7/1975 | Johnson | 220/909 |
| 4,834,262 | 5/1989 | Reed | 220/909 |
| 4,913,308 | 4/1990 | Culbertson | 220/909 |
| 4,974,746 | 12/1990 | Dickinson | 220/909 |
| 5,005,727 | 4/1991 | Roth | 220/909 |
| 5,033,641 | 7/1991 | Martin | 220/909 |

FOREIGN PATENT DOCUMENTS 1012559  7/1957  Fed. Rep. of Germany ...... 220/909

*Primary Examiner*—Joseph Man-Fu Moy
*Attorney, Agent, or Firm*—John R. Flanagan

[57] ABSTRACT

A receptacle for facilitating separating of recyclable trash includes a container body, flat panels for forming a plurality of adjustable-size separate compartments in the container body, and an upper lid hingedly mounted on the container body. A bag retaining arrangement is mounted on a top rim or an interior ledge spaced below the top rim of the container body. A can crusher module is removably mounted to opposing portions of the interior surface of an upper portion of the container body so as to overlie one of the separate compartments in the container body.

9 Claims, 5 Drawing Sheets

RECEPTACLE FOR FACILITATING RECYCLABLE TRASH SEPARATION

CROSS-REFERENCE TO RELATED APPLICATION

This application is a continuation-in-part of copending U.S. patent application Ser. No. 584,169, filed Sept. 18, 1990, now U.S. Pat. No. 5,072,852 issued Dec. 17, 1991.

BACKGROUND OF THE INVENTION

1. Field of the Invention

The present invention generally relates to receptacles for enabling the separating of trash for recycling purposes and, more particularly, is concerned with a receptacle with improved features for facilitating separating of recyclable trash.

2. Description of the Prior Art

Use of landfills for trash and refuse disposal has had detrimental consequences for ground water quality in many parts of the United States. Many communities are turning instead to recycling of refuse materials as an alternative approach to refuse removal and disposal more compatiable with the environment and long-term public health. For recycling to be successful communities are realizing that the bulk of the responsibility for separating various types of trash has to be placed onto the individual household and business where the trash is generated in the first place.

Individual acceptance of this responsibility depends to a large degree on having a suitable means for facilitating convenient, sanitary and easy separation and temporary storage of the various types of trash in the household and business. The predominate way unseparated trash is currently stored temporarily in households and business is in a waste receptacle lined with a plastic bag. Examples of such receptacles are disclosed in U.S. Pat. Nos. to Isgar et al (4,576,310) and Dow (4,338,979).

Adaptation of this current practice for promotion of separation of refuse for recycling has been proposed in the prior art. Representative examples are multiple compartment receptacles disclosed in U.S. Pat. Nos. to Crine (4,834,253), Reed (4,834,262) and Heller (4,874,111) and structures in the form of multiple plastic bag and multiple drawer holders for temporary storage of separated trash. While these receptacles and structures represent a step in the right direction, the inventors herein have perceived that these proposals fall far short of meeting the criteria of most households and businesses for an acceptable way to separate and temporarily store trash into recyclable groups.

Consequently, a pressing need exists to provide households and businesses with an attractive and sanitary product that persons will be comfortable around and feel free to use. Also, the product must be one that will unobtrusively fit in those areas currently accustomed to having a conventional trash receptacle.

SUMMARY OF THE INVENTION

The present invention provides a receptacle for facilitating separating of recyclable trash having improved features designed to satisfy the aforementioned needs. The receptacle of the present invention provide households and businesses with an attractive and sanitary product that persons will feel comfortable around and find convenient and easy to use. Also, the receptacle can unobtrusively fit in those areas currently accustomed to having a conventional trash receptacle.

The receptacle of the present invention includes a container body having an open top and an interior storage cavity. The receptacle also includes an upper lid hinged to a top rim of the container body. The upper lid is openable and closable for permitting access to the cavity of the container body and the plastic trash bags held therein and thereby use of the enclosed receptacle to receive separated trash while sealing the container body during period of nonuse of the receptacle. The upper lid can be solid. Alternatively, it can have a pair of panel doors and guide tracks mounting the doors for sliding movement relative to one another for gaining access to individual ones of the separate compartments holding the trash bags in the container body, without lifting the lid.

The receptacle of the present invention also includes a plurality of flat panels for forming a plurality of adjustable-size separate compartments in the storage cavity of the container body. Pairs of facing vertical grooves are formed on interior surfaces of front and rear walls of the container body. The flat panels are removably insertable into selected ones of the pairs of facing grooves to form the separate compartments within the cavity of the container body.

The receptacle of the present invention further includes an arrangement for retaining the open top edge of the plastic trash bags at a location along or adjacent to the top rim of the container body. In one embodiment, the retaining arrangement is provided on an interior annular ledge of the container body spaced below the top rim thereof. In another embodiment, the retaining arrangement is provided in conjunction with the hinged lid and the top rim of the container body. In both embodiments, the bag retaining arrangement includes a hollow channel and bag retainer means mounted within the channel for releasably gripping the top edge of the trash bags such that they ca be installed or removed from the retaining arrangement.

Two embodiments of the bag retainer means are disclosed. In one embodiment, the bag retainer means is a flexible gripping strip running along the hollow channel attached on the interior annular ledge or formed on the top rim of the container body. The gripping strip has a central slit formed downwardly from its upper surface. Opposite side walls of the slit will grip and retain the top open edge of the plastic bags when inserted into the slit. In the other embodiment, the bag retainer means is a flexible elastic stretch cord entrained about the hollow channel on the top rim of the container body. The cord will engage and retain the top open edge of the plastic bags over the top rim of the container body.

The receptacle of the present invention also includes a can crusher module slidably and removably mounted to tracks formed on the interior of the upper portion of the container body. Further, a U-shaped newspaper and magazine carrier is provided that fits within one compartment of the container body and has a handle for use in removing it.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
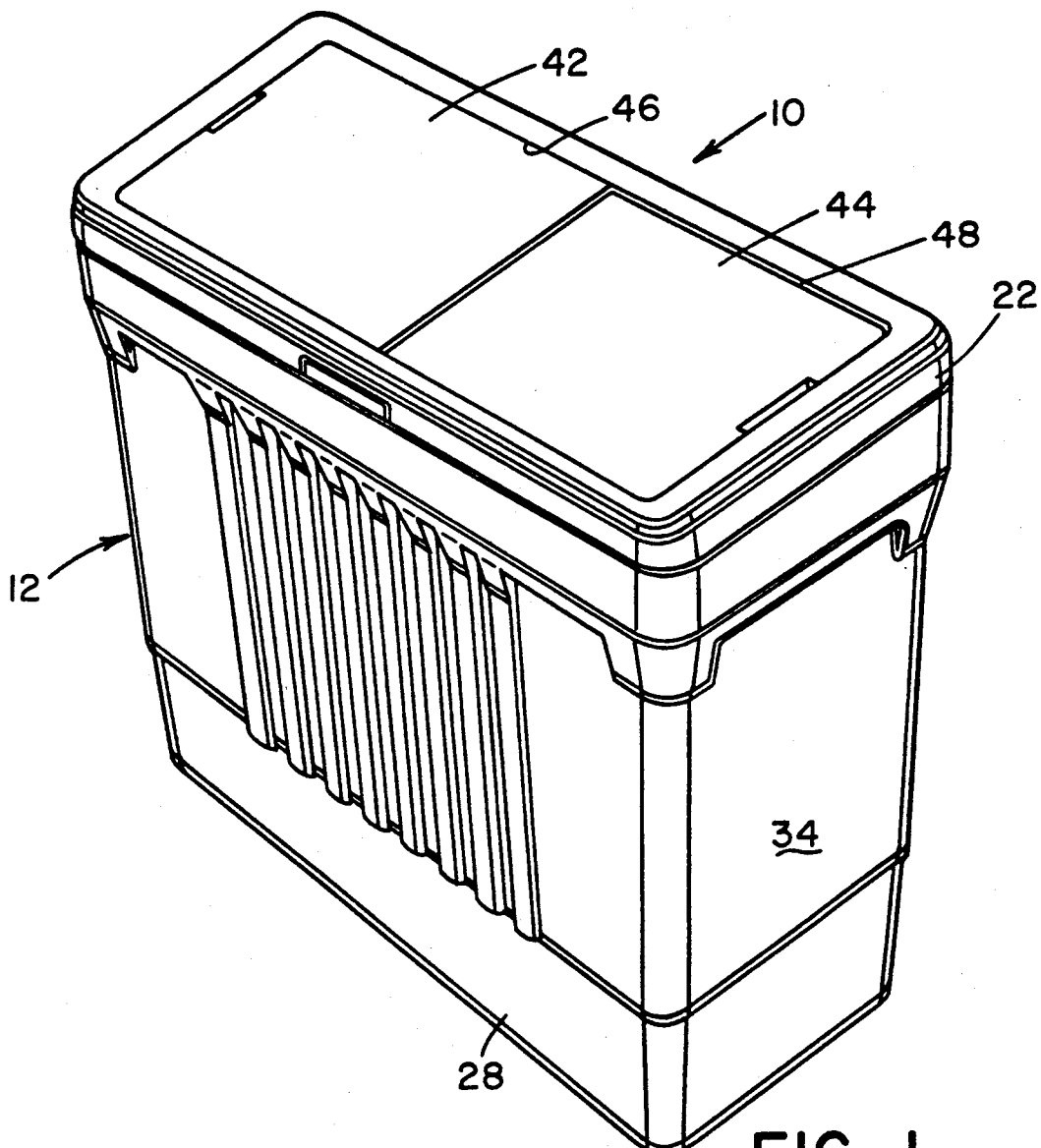
FIG. 1 is a perspective view of a receptacle in accordance with the present invention showing a lid of the receptacle in a closed position relative to a container body of the receptacle.

Referring to the drawings, and particularly to FIGS. 1-6, there is shown a receptacle of the present invention, generally designated 10, which is designed for enabling separation of different types of recyclable trash. Some of the improved features of the receptacle 10 which enhance its usefulness in promoting the recycling of trash include a container body 12 having an open top 14 and an interior storage cavity 16, and a plurality of flat panels 18 for forming a plurality of adjustable-size separate compartments 20 in the container body 12. Other improved features are an upper lid 22, a bag retaining arrangement 24, and a can crusher module 26.

The container body 12 of the receptacle 10 is composed of a front wall 28, a rear wall 30, a pair of opposite side walls 32, 34, and a bottom wall 36 being interconnected to define the open top 14 and interior cavity 16. Multiple pairs of aligned facing vertical grooves 38 are formed on the interior surfaces of the front and rear walls 28, 30. The flat panels 18 are removably insertable into selected ones of the aligned pairs of grooves 38 to form the separate storage compartments 20 within the interior cavity 16 of the container body 12.

Figure 3:
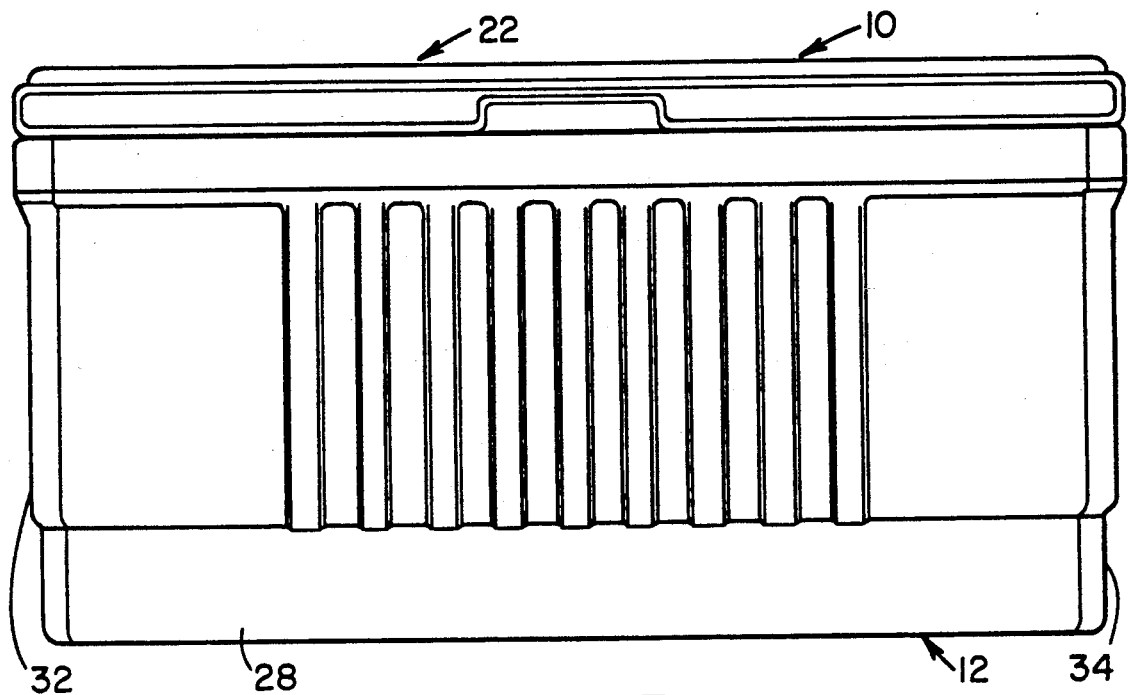
FIG. 3 is a front elevational view of the receptacle as seen along line 3—3 of FIG. 3.

The upper lid 22 of the receptacle 10 is hingedly mounted at 40 on the upper rear edge of the container body 12. The lid 22 can be pivotably lifted relative to the container body 12 from a lowered closed position, as shown in FIGS. 1-3, to a raised opened position, as shown in FIG. 4, for permitting access to the interior storage cavity 16, and thus to the separate storage compartments 20, of the container body 12 and the plastic trash bags B held therein in order to place separated trash in the bags.

Figure 2:
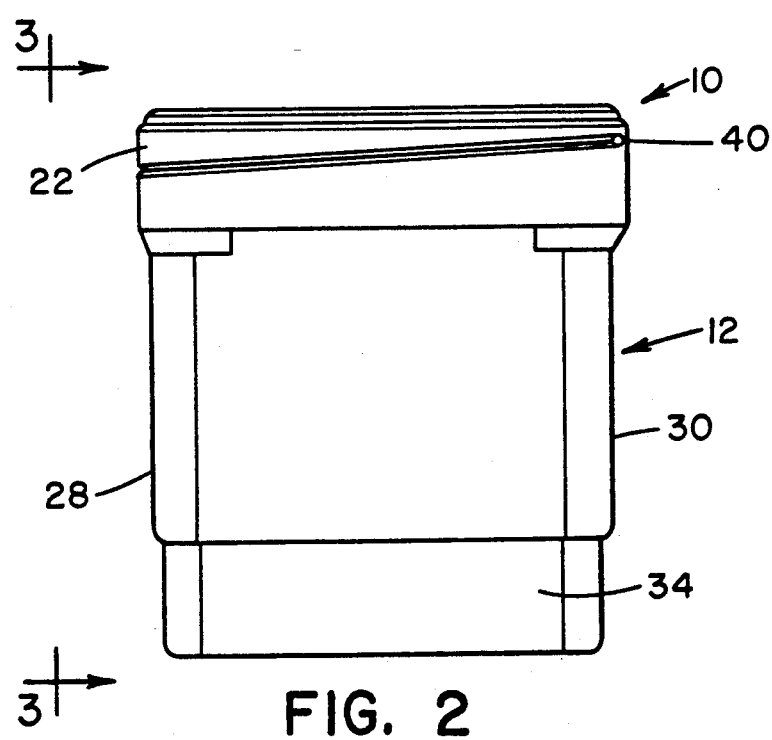
FIG. 2 is an end elevational view of the receptacle of FIG. 1.
Figure 4:
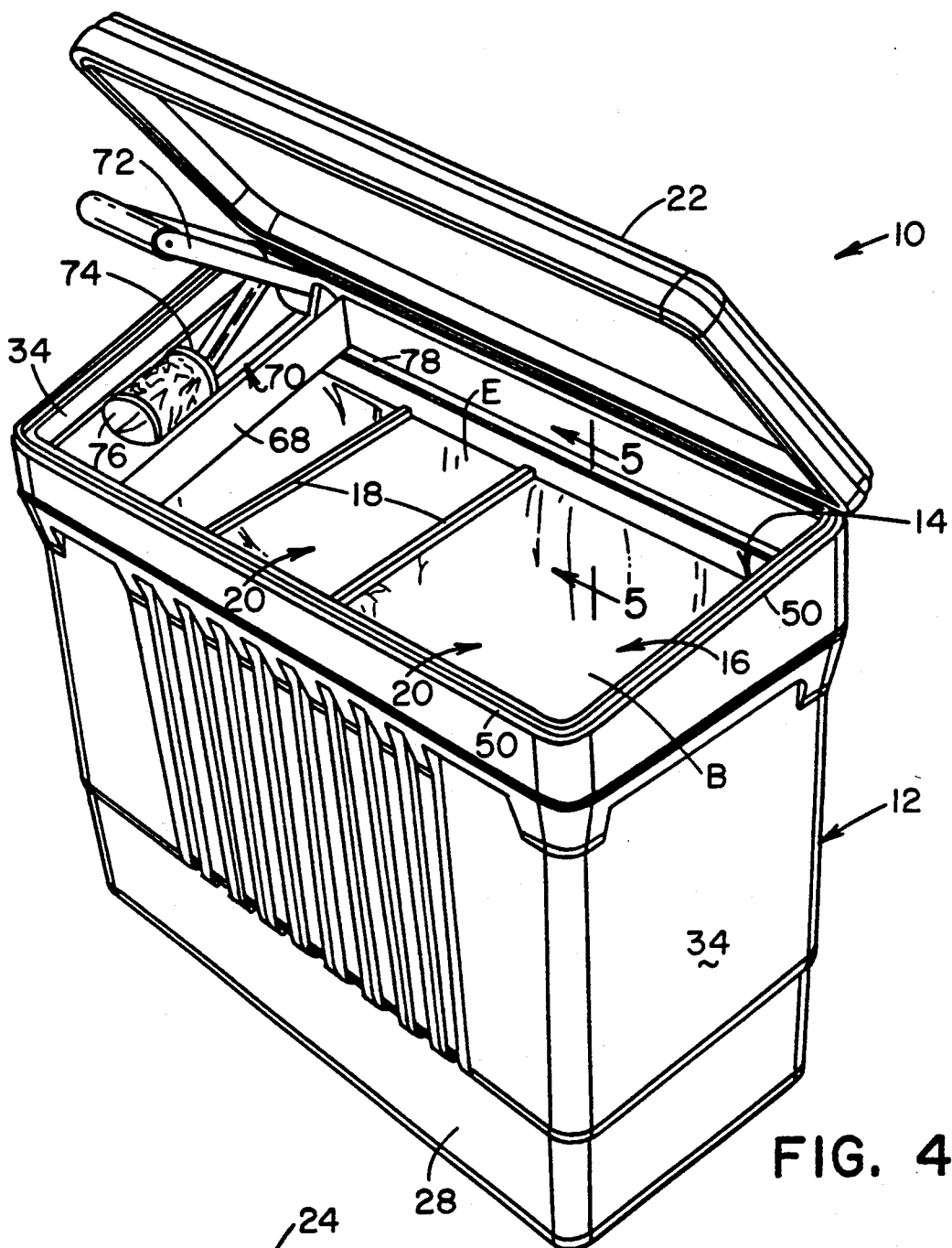
FIG. 4 is a perpective view of the receptacle of FIG. 1, showing the lid of the receptacle in an opened position relative to the container body and a can crusher module slidably mounted on a track formed on the interior of the upper portion of the container body.

The upper lid 22 can be a solid panel, as shown in FIG. 4, or alternatively, as shown in FIGS. 1 and 2, it can have a pair of upper and lower panel doors 42, 44 and opposite aligned pairs of upper and lower guide tracks 46, 48 at the interior edges of the upper lid 22 which respectively mount the doors 42, 44 along their opposite edges for sliding movement relative to one another. Each door 42, 44 is slid along the respective pair of guide tracks 46, 48 for gaining access to individual ones of the separate compartments 20 which hold the respective trash bags B in the container body 12. Thus, the slidable panel doors 42, 44 are employed to open and close the receptacle 10 without the necessity for lifting the upper lid 22. When not being used, the container body 12 can be sealed closed by sliding the doors 42, 44 away from one another to closed positions, as shown in FIG. 1.

Figure 7:
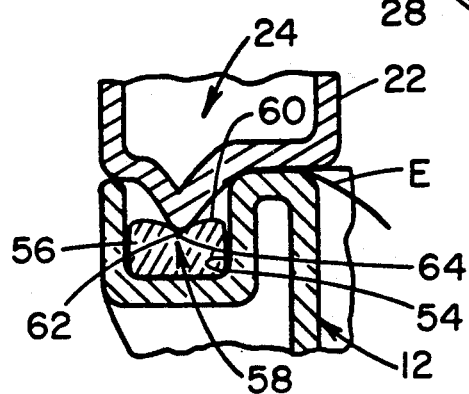
FIG. 7 is an enlarged fragmentary vertical sectional view of the container body of the receptacle taken along line 7—7 of FIG. 6, showing the other embodiment of the bag retaining arrangement on the container body with the lid of the receptacle in the closed position.
Figure 5:
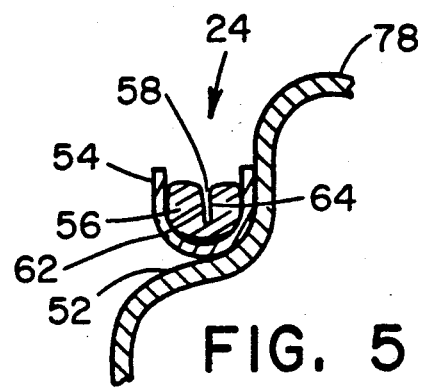
FIG. 5 is an enlarged fragmentary vertical sectional view of the container body of the receptacle taken along line 5—5 of FIG. 4, showing one embodiment of a bag retaining arrangement in the container body.

Two embodiments of the bag retaining arrangement 24 can be employed in the receptacle 10 for retaining the open top edge E of the plastic trash bags B to the container body 12 at a location along or adjacent to the top rim 50 of the container body. In one embodiment illustrated in FIGS. 4 and 5, the retaining arrangement 24 is provided on an interior annular ledge 52 of the container body 12 spaced below the top rim 50 thereof. In another embodiment illustrated in FIGS. 6 and 7, the retaining arrangement 24 is provided in conjunction with the hinged lid 22 and the top rim 50 of the container body 12. In both embodiments, the bag retaining arrangement 24 includes a hollow channel 54 and bag retainer means 56 mounted within the channel 54 for releasably gripping the top edges E of the trash bags B such that they can be installed or removed from the retaining arrangement.

Two embodiments of the bag retainer means 56 are disclosed. In one embodiment shown in FIGS. 5 and 7, the bag retainer means 56 is a flexible gripping strip running along the hollow channel 54 attached on the interior annular ledge 52 or formed on the top rim 50 of the container body 12 and also running along the top edges of the panels 18 which divide the container body 12 in the separate compartments 20. The gripping strip 56 has a generally solid square cross-sectional configuration of a size which substantially fits the cross-section of the channel 54, such that the strip 56 will be retained therein primarily by friction. The strip 56 has a longitudinal slot or slit 58 formed centrally therein extending longitudinally along and downwardly from its upper surface 60. The slit 58 is defined by a pair of opposite side walls 62, 64 which face one another. The slit side walls 62, 64 will spread apart opening the slit 58 in response to application of a downwardly-directed pushing force on them to insert the top open edges E of the plastic bags B into the slit 56. The side walls 62, 64 will grip the top open edges E of the plastic bags B and tend to retain them in response to application an upwardly-directed pulling force on them used to withdraw the top open edges E of the plastic bag B from the gripping strip 56.

Figure 8:
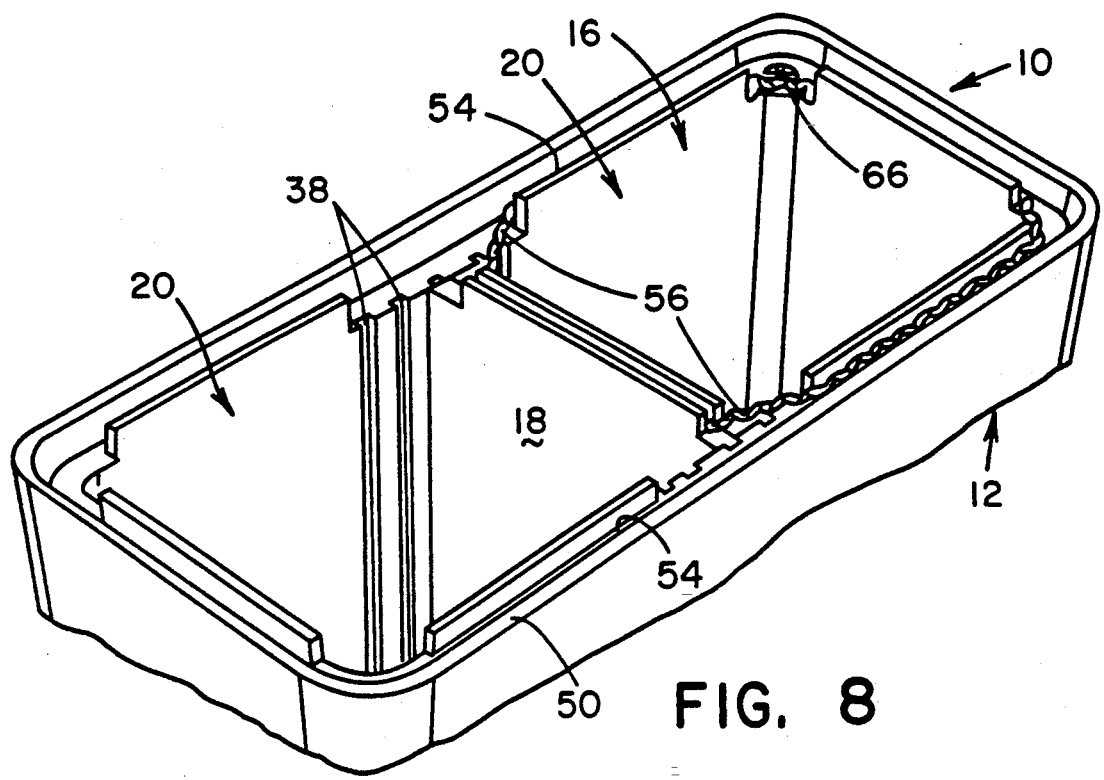
FIG. 8 is an enlarged fragmentary perspective view of the receptacle with the upper lid removed to illustrate another embodiment of a member for retaining the open top edge of the plastic bags over the top rim of the container body.

In the other embodiment shown in FIG. 8, the bag retainer means 56 is a flexible elastic stretch cord entrained about the hollow channel 54 on the top rim 50 of the container body 12. The cord 56 will engage and retain the top open edges E of the plastic bags B over the top rim 50 of the container body 12 and the top edge of the flat panel 18. Also, the bag retaining arrangement 24 includes one or more clips 66 for attaching the cord 56 to the container body 12. The top open edge E of the plastic bag B can be inserted into the channel 54 under the elastic stretch cord 56 to retain it over the top rim 50 of the container body 12.

Figure 6:
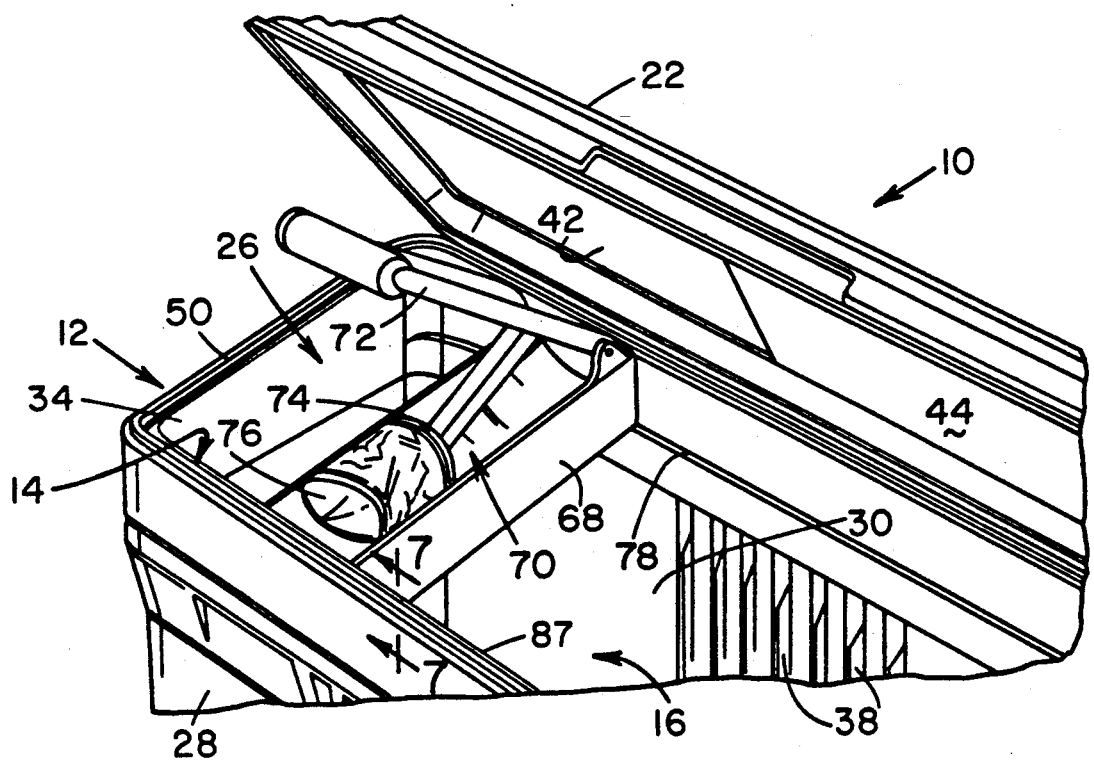
FIG. 6 is a fragmentary perspective view of the receptacle of the present invention another embodiment of the bag retaining arrangement.

Referring to FIGS. 4 and 6, there is illustrated the can crusher module 26 being removably and slidably mounted on the interior of the upper portion of the container body 12. The can crusher module 26 is an optional feature that can be employed with the receptacle 10. More particularly, the can crusher module 26 includes a mounting bracket 68 extending across an upper portion of the cavity 20 of the container body 12 and removably mounted to opposing portions of the upper portion of the container body 12. The module 26 also includes a can crusher mechanism 70 mounted on the mounting bracket 68 which is conventional per se having a pivotal lever arm 72 with a movable platen 74 which will crush a metal can placed between it and another platen 76 stationarily mounted on the bracket 68. A pair of upper ledges 78 defined along the opposing front and rear portions of the upper portion of the container body 12 define tracks which run the length of the receptacle 10 permitting the can crusher module 26 to be slid along the receptacle 10 to any desired position where it will be most convenience to use.

Figure 9:
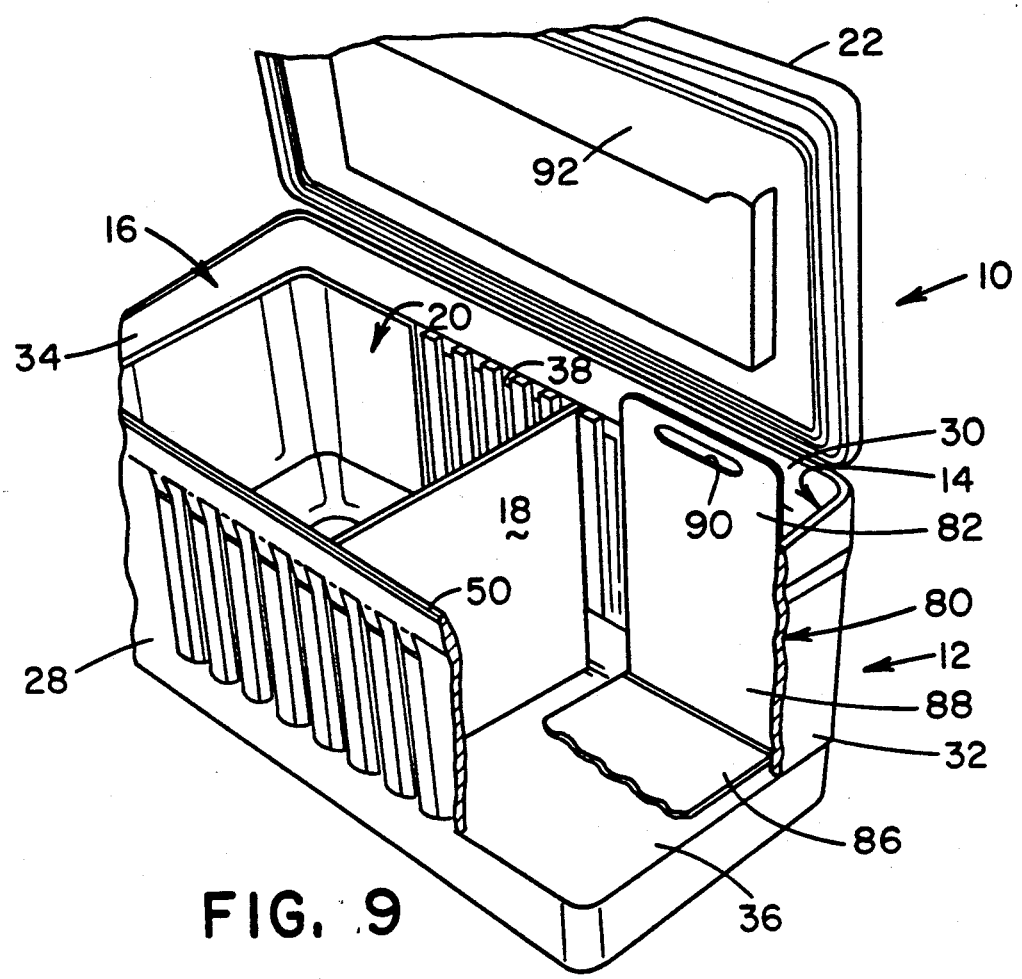
FIG. 9 is a fragmentary perspective view of the receptacle of the present invention having a newspaper carrier therein.
Figure 10:
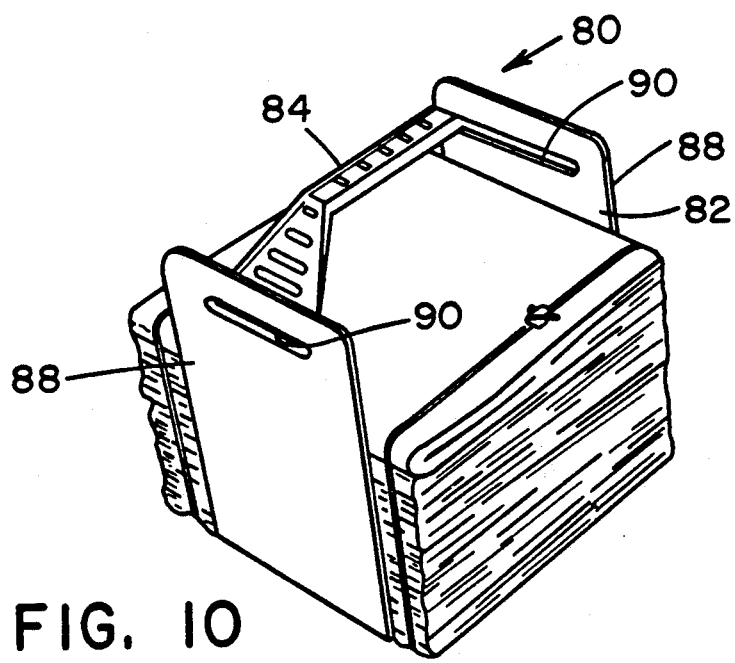
FIG. 10 is a perspective view of the newspaper carrier removed from the receptacle of FIG. 9.

Referring to FIGS. 9 and 10, there is illustrated the receptacle 10 of the present invention employing a newspaper and magazine carrier 80 that fits within one of the compartment 20 of the container body 12. The carrier 80 includes a holder 82 and a handle 84 for use in lifting it into and from the one of the storage compartments 20 of the container body 12. The holder 82 has an overall U-shaped configuration being composed of a flat base 86 and a pair of upstanding opposite ends 88 rigidly attached to and extending upright from the base 86. The holder 82 also includes a slot 90 defined in the upper portion of each upstanding end 88 which receives opposite ends of the handle 84.

As shown in FIG. 9, a shelf 92 can be provided on the lower interior surface of the upper lid 22 of the receptacle 10 for allowing storage of and easy access to items such as string, tape and plastic ties to be used in wrapping newspapers and in tying the tops of plastic bags.

It is thought that the present invention will be understood from the foregoing description and it will be apparent that various changes may be made thereto without departing from its spirit and scope or sacrificing all of its material advantages, the form hereinbefore described being merely preferred or exemplary embodiment thereof.

Having thus described the invention, what is claimed is:

1. A receptacle for facilitating separating of recyclable trash, comprising:
   (a) a container body having an open top and an interior storage cavity, said container body having an interior annular ledge being spaced below said open top of said container body;
   (b) means for defining separate storage compartments in said storage cavity of said container body below said interior annular ledge for receiving flexible storage bags in which to place separated trash;
   (c) an arrangement for retaining open top edges of the flexible bags on said container body and on said means defining said separate storage compartments to maintain the bags open for receiving separated trash, said bag retaining arrangement including a hollow channel being open along an upper end and formed about said interior annular ledge on said container body and spaced below said open top of said container body, said bag retaining arrangement also including a flexible gripping strip inserted within and running along said channel, said gripping strip having a cross-sectional configuration sized to fit within said hollow channel and an elongated slit formed along and extending downwardly form an upper surface of said strip and defined by a pair of side walls for receiving through said open upper end of said channel the open top edge of the flexible storage bag and gripping the open top edge of the flexible bag between said slit side walls; and
   (d) an upper lid hingedly mounted on said open top of said container body for movement between an opened position for permitting access to said separate storage compartments and the flexible bags therein and a closed position for preventing access to said storage compartments.

2. The receptacle of claim 1 wherein said compartment defining means includes a plurality of flat panels for forming a plurality of adjustable-size separate compartments in said container body.

3. The receptacle of claim 1 further comprising:
   a newspaper and magazine carrier that fits within one compartment of the container body, said carrier including a holder and a handle attachable to said holder for use in lifting and moving said holder.

4. The receptacle of claim 1 further comprising:
   a can crusher module removably mounted to opposing upper portions of said container body.

5. The receptacle of claim 4 wherein said can crusher module includes:
   a mounting bracket extending across an upper portion of the cavity of the container body and removably mounted to said opposing portions of said container body; and
   a can crusher mechanism mounted on said mounting bracket.

6. The receptacle of claim 1 wherein said lid includes:
   a pair of upper and lower panel doors; and
   pairs of upper and lower guide tracks respectively mounting said doors for sliding movement relative to one another for gaining access to the bags in individual ones of said separate storage compartments without lifting said upper lid.

7. The receptacle of claim 1 wherein said compartment defining means is multiple pairs of vertical grooves are formed on interior surfaces of one of a pairs of opposing sides of said cavity.

8. The receptacle of claim 7 wherein:
   said first pair of opposing sides of said container body includes a front wall and rear wall, said receiving and aligning means being formed on said front wall and rear wall; and
   said second pair of opposing sides of said container body includes a pair of opposite side walls extending between and interconnecting said front wall and rear walls.

9. A receptacle for facilitating separating of recyclable trash, comprising:
(a) a container body having an open top and an interior storage cavity;
(b) means for defining separate storage compartments in said storage cavity of said container body for receiving flexible storage bags in which to place separated trash;
(c) an arrangement for retaining open top edges of the flexible bags on said container body and on said means defining said separate storage compartments to maintain the bags open for receiving separated trash, said bag retaining arrangement including a hollow channel being open at an upper end and formed about said open top of said container body, said bag retaining arrangement also including a flexible gripping strip inserted within and running along said channel, said gripping strip having a cross-sectional configuration sized to fit within said hollow channel and an elongated slit formed along and extending downwardly from an upper surface of said strip and defined by a pair of side walls for receiving through said open upper end of said channel the open top edge of the flexible storage bag and gripping the open top edge of the flexible bag between said slit side walls; and
(d) an upper lid hingedly mounted on said open top of said container body for movement between an opened position for permitting access to said separate storage compartments and the flexible bags therein and a closed position for preventing access to said storage compartments.

* * * * *